United States Patent
Sinha et al.

(10) Patent No.: US 8,966,530 B2
(45) Date of Patent: Feb. 24, 2015

(54) SYSTEMS AND METHODS FOR PRESENTING MULTIPLE ASSETS IN AN INTERACTIVE MEDIA GUIDANCE APPLICATION

(75) Inventors: Gaurav Sinha, Los Angeles, CA (US); Daniel T. Ward, Los Angeles, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 332 days.

(21) Appl. No.: 13/340,274

(22) Filed: Dec. 29, 2011

(65) Prior Publication Data

US 2013/0174200 A1 Jul. 4, 2013

(51) Int. Cl.
*H04N 5/445* (2011.01)
*G06F 3/00* (2006.01)

(52) U.S. Cl.
USPC .............................................. 725/40; 725/46

(58) Field of Classification Search
CPC .................... H04N 21/4332; H04N 21/47202; H04N 21/482
See application file for complete search history.

(56) References Cited

U.S. PATENT DOCUMENTS

| | | | | |
|---|---|---|---|---|
| 8,020,186 | B1* | 9/2011 | Sie et al. | 725/87 |
| 2004/0205816 | A1* | 10/2004 | Barrett | 725/49 |
| 2005/0097601 | A1* | 5/2005 | Danker et al. | 725/39 |
| 2006/0020973 | A1* | 1/2006 | Hannum et al. | 725/46 |
| 2007/0204299 | A1* | 8/2007 | Vosseller | 725/46 |
| 2010/0291969 | A1* | 11/2010 | Fujimoto | 455/556.1 |
| 2010/0325655 | A1* | 12/2010 | Perez | 725/30 |
| 2010/0333133 | A1* | 12/2010 | Krakirian et al. | 725/32 |
| 2011/0078731 | A1* | 3/2011 | Nishimura | 725/39 |
| 2011/0247035 | A1* | 10/2011 | Adimatyam et al. | 725/39 |
| 2013/0321703 | A1* | 12/2013 | Yuki | 348/565 |

* cited by examiner

*Primary Examiner* — Gigi L Dubasky
(74) *Attorney, Agent, or Firm* — Ropes & Gray LLP

(57) ABSTRACT

Systems and methods for presenting multiple assets in an interactive media guidance application are provided. A guidance display containing media guidance application listings is provided, where non-linear media assets are extracted from the media guidance application listings and the guidance display is divided into different portions to present media guidance application listings of non-on-demand media assets and non-linear media assets. One portion of the guidance display may include media guidance application listings of non-on-demand assets and may indicate the non-linear media assets extracted from the portion of the guidance display. Another portion may include media guidance application listings of non-linear media assets that were extracted from the media guidance application listings. This portion may also include additional non-linear assets that are available for retrieval and playback.

20 Claims, 11 Drawing Sheets

| Tue | 7:00 pm | 7:30 pm | 8:00 pm | 8:30 pm | 9:00 pm |
|---|---|---|---|---|---|
| 1 FOX | Live News 01 | Live Entertainment Updates | | Live Entertainment Updates | |
| 2 ESPN | Live NBA Game | | Recorded NBA Game | | |
| 3 ABC | Live Show 01 | Show 02 | | Show 03 | |
| 4 CNN | Live News 02 | Current Affair Analysis | | Stock Market Analysis | |
| 5 CMDY | Live Stand Up Comedy | | Movie 01 | | |
| 6 TNT | Movie 02 | | | Movie 02 | |
| 7 HIST | Show 01 | Show 02 | Show 03 | New Moon | Show 04 |
| 8 TBS | American Werewolf in London (6:00-8:30) | | | | |
| ... | | | | | |
| 901 HORSE1 | A Man Named Horse (A&E) | | The Horse Wisperer (TNT) | | Mr. Ed (NICK) |
| 902 HORSE2 | Only Fools and Horses (BBC) | | Seabiscuit (VOD) | | |
| 903 VAMPIRE | American Werewolf in London (BRAV) | | New Moon (VOD) | | |

FIG. 5

```xml
<?xml version="1.0" encoding="ISO-8859-1" ?>

<listing_data>
    <item1=listing1>
        <location>90028</location>
        <date>12/12/2007</date>
        <listing>program_title="New Moon"</listing>
        <genre>movie</genre>
        <keyword>vampire, werewolf</keyword>
        <content_type>on_demand</content_type>
        <channel_num>8</channel_num>
        <channel_id>TBS</channel_id>
        <time>8:00PM</time>
        <dynamic_place>yes</dynamic_place>
    </item1>

<item2=listing2>
        <location>90028</location>
        <date>12/12/2007</date>
        <listing>program_title="The Simpsons"</listing>
        <genre>animated, cartoon</genre>
        <keyword>homer</keyword>
        <content_type>broadcast</content_type>
        <channel_num>5</channel_num>
        <channel_id>FOX</channel_id>
        <time>5:00PM</time>
        <dynamic_place>no</dynamic_place>
    </item2>

</listing_data>

<extracted_data>
    <listing_num>101</listing_num>
    <listing>program_title="New Moon"</listing>
    <animation>slide_down</animation>
</extracted_data>
```

FIG. 13

SYSTEMS AND METHODS FOR PRESENTING MULTIPLE ASSETS IN AN INTERACTIVE MEDIA GUIDANCE APPLICATION

BACKGROUND OF THE INVENTION

Due to the overwhelming volume of media content (e.g., television shows) available to the average person (e.g., via cable or satellite television), interactive media guidance applications, such as interactive program guides, have gained widespread popularity. Typically, these guidance applications present guide listings in a two-dimensional grid indexed by time and source (e.g., a television channel).

In addition to providing access to programs provided according to a schedule, these guidance applications also provide access to non-linear programming which is not provided according to a schedule, such as on-demand content. As the popularity of on-demand content and other non-linear programming continues to grow, advanced media guidance support is becoming increasingly important. For example, the two-dimensional grid provided by these guidance applications may need to be adjusted.

SUMMARY OF THE INVENTION

In view of the foregoing, systems and methods for presenting multiple assets in an interactive media guidance application are provided. In particular, a guidance display containing media guidance application listings is provided, where non-linear (e.g., on-demand) media assets are extracted from the media guidance application listings and the guidance display is divided to present media guidance application listings of non-on-demand media assets and non-linear media assets. One portion may include media guidance application listings of non-on-demand assets, such as broadcast listings, and may indicate the non-linear media assets extracted from the portion of media guidance application listings. Another portion may include media guidance application listings of non-linear media assets that were extracted from the media guidance application listings. This portion may also include additional non-linear assets that are available for retrieval and playback.

In some embodiments, a user request to display a plurality of media guidance application listings (e.g., program listings) is received. In particular, a user may select a television listings icon from a guidance display to instruct control circuitry to retrieve program listings. The control circuitry may, in response to receiving the request, present a guidance display that includes a plurality of media guidance application listings. The media guidance application listings may include listings corresponding to non-linear assets and non-on-demand assets.

In some embodiments, a user request to organize the plurality of media guidance application listings is received. In particular, a user may select a "clean up" or organization option from a guidance display to instruct control circuitry to divide the media guidance application listings in the guidance display.

The control circuitry may, in response to receiving the request to organize the guidance display, extract the media guidance application listings of non-linear assets. In addition, the control circuitry may cause the displayed media guidance application listings to be divided into a first portion of content listings and a second portion of content listings.

The first portion of content listings may include a portion of the media guidance application listings of the non-on-demand assets from the guidance display. The first portion of content listings may also indicate the non-linear assets extracted from within the first portion of content listings. For example, a cell corresponding to an non-linear asset may be shaded, or blackened to indicate the extraction of the on-demand asset. In another example, in response to receiving the request to organize the guidance display, the control circuitry may animate the extraction of non-linear assets from the guidance display. In particular, the control circuitry may cause one or more animations to provide the appearance of dividing the guidance display into a first portion and a second portion, highlighting media guidance application listings of non-linear assets, sliding those listings to the second portion of the guidance display, and fading the extracted listings back to indicate the extraction of the non-linear assets.

The second portion of content listings may include media guidance application listings of the non-linear assets extracted from the first portion of content listings. In some embodiments, the second portion of guide listings may include additional listings of non-linear assets available to the user. For example, the second portion of content listings may include non-linear assets available to the user that were not listed in the guidance display.

In some embodiments, the first portion of content listings may be displayed as a program listings grid and the second portion of content listings may be displayed as a list of the extracted non-linear assets.

In some embodiments, the guidance display may be divided horizontally, where the first portion of content listings are displayed in a grid format above the second portion of content listings of on-demand assets. Alternatively, the guidance display may be divided vertically, where the first portion of content listings and the second portion of content listings are displayed side by side.

In some embodiments, the user may be provided with a navigation option that allows the user to navigate between media guidance application listings in different portions of the guidance display. For example, upon dividing the media guidance application listings between on-demand assets and non-on-demand assets, the control circuitry may highlight a cell within the second portion of content listings that contains non-linear assets and allows the user to navigate between media guidance application listings of non-linear assets. Upon receiving an indication that the user has selected the navigation option, the control circuitry may direct the highlight region to a call within the first portion of the content listings or another divided portion of the guidance display.

In some embodiments, the control circuitry may perform the extraction of non-linear listings based on a category of interest received from the user. For example, in response to receiving the request to organize the non-linear assets in a guidance display, the control circuitry may generate a prompt for display. The prompt may provide the user with an opportunity to input a category of interest, such as a particular genre (e.g., sports, family, action, game shows, etc.). Based on the received category of interest, the control circuitry may extract non-linear listings that fall within the received category of interest. Additionally, the control circuitry may divide the guidance display, where the second portion of non-linear media assets includes the extracted non-linear listings in the category of interest.

It should be noted that, although the embodiments described herein generally refer to non-linear media assets and non-on-demand media assets, this is merely illustrative. For example, the control circuitry may divide the guidance display to present media guidance application listings between linear programming (e.g., broadcast listings) and non-linear programming (e.g., on-demand listings, recorded media listings, Internet content listings, etc.). In another example, the control circuitry may provide the user with a menu option for selecting content types and/or categories of interest for dividing the guidance display (e.g., extract recorded content listings placed into the guidance display and divide the guidance display to create a grid portion of broadcast listings and a list portion of recorded content listings).

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 shows an illustrative display screen that may be used to provide non-on-demand media guidance application listings and on-demand media guidance application listings in accordance with some embodiments of the invention;

FIG. 13 shows an illustrative example of a file in Extensible Markup Language (XML) for retrieving content data used to generate displays having divided media guidance application listings in accordance with some embodiments of the invention.

DETAILED DESCRIPTION OF EMBODIMENTS

Figure 1:
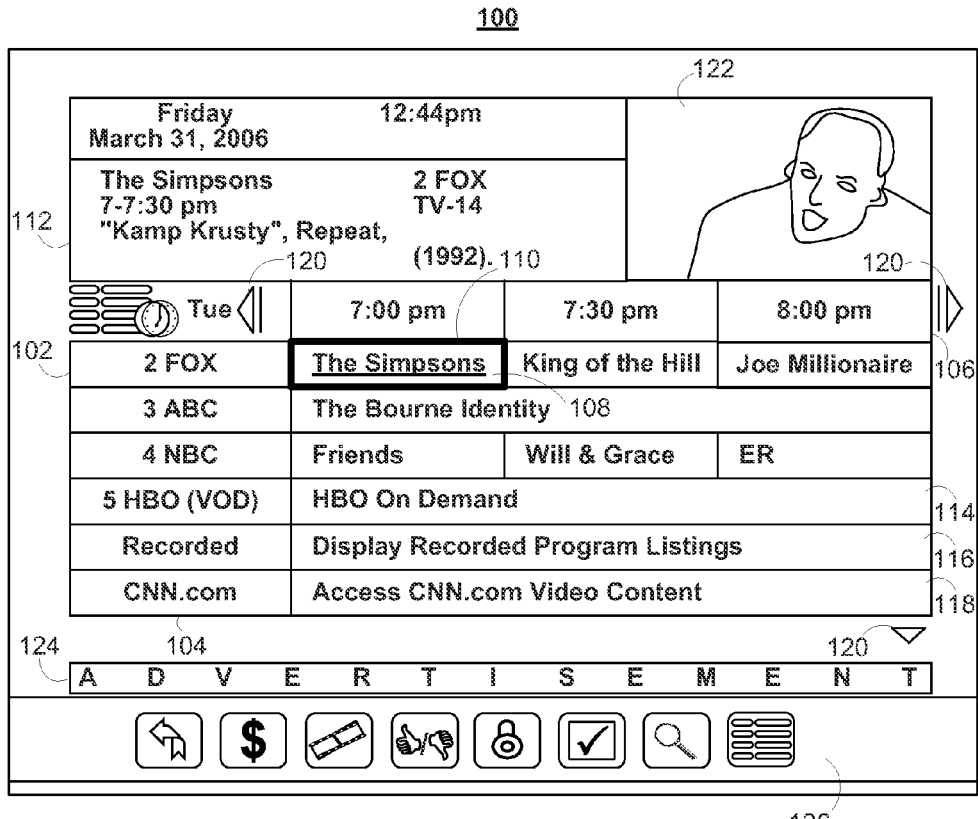
FIGS. 1 and 2 show illustrative displays screens that may be used to provide media guidance application listings in accordance with some embodiments of the invention.

This invention generally relates to systems and methods for presenting multiple assets in an interactive media guidance application. In particular, systems and methods are provided for allowing a user to extract on-demand listings from a display of guide listings for presentation in a different portion of the display.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
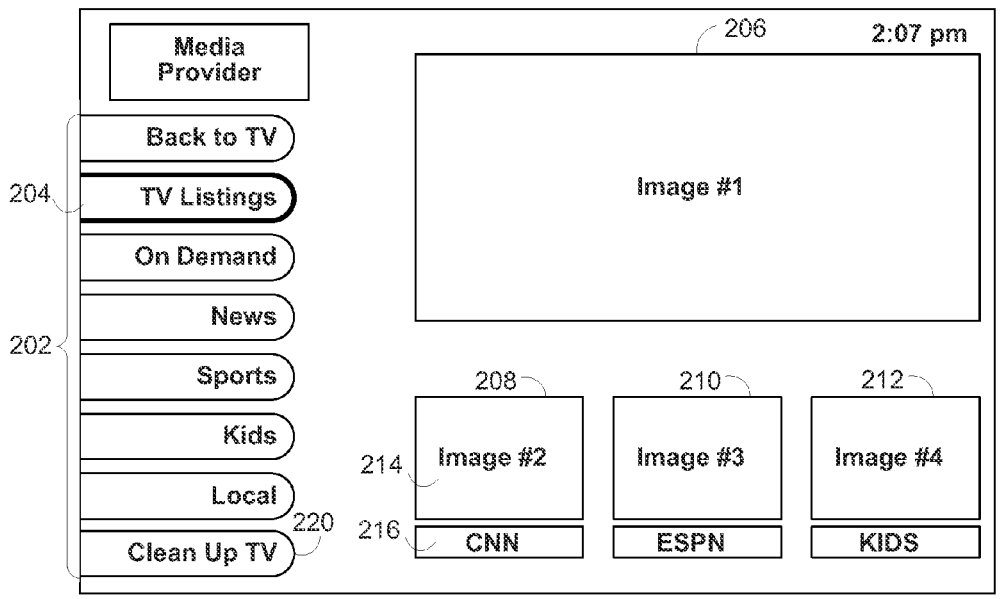

FIGS. 1-2 show illustrative display screens that may be used to provide media guidance data. The display screens shown in FIGS. 1-2 and 5-11 may be implemented on any suitable user equipment device or platform. While the displays of FIGS. 1-2 and 5-11 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

In some embodiments, the user may navigate through media guidance application listings, such as the content listings shown in FIG. 1. The user may request that the media guidance application organize the content listings by positioning highlight region 110 over an organization option and pressing a suitable key on a remote control (e.g., a select key). Alternatively, when the media guidance application is executed on a wireless communications device with a touch screen, the user may make contact with the touch screen using any suitable object or appendage, such as a stylus, finger, etc. For example, instead of pressing a suitable key on the remote control, the media guidance application may respond to contact with a touch screen, such as one or more taps on the touch screen, maintaining continuous contact with the touch screen, movement of the point of contact while maintaining continuous contact, a breaking of the contact, or any combination thereof.

In some embodiments, the media guidance application may provide the user with one or more displays for organizing media guidance application listings. For example, as shown in FIGS. 5-11, the media guidance application may determine which listings from the media guidance application listings are on-demand listings. In a more particular example, the media guidance application may access a media guidance data source or media content source and search through content metadata to determine which listings are on-demand listings. It should be noted that the media guidance application may determine on-demand listings within the media guidance application listings displayed in the grid shown in FIG. 2, within the media guidance application listings stored in user equipment (see, e.g., storage 308 of FIG. 3), or through any other suitable number of listings.

As shown in FIGS. 5-11, the media guidance application may extract the on-demand listings from the guidance display and provide them in a different portion of the display. The media guidance application may also continue to provide non-on-demand listings in a portion of the display, where the extracted on-demand listings are indicated.

In some embodiments, the media guidance application may prompt the user to select a genre or a category of interest (e.g., news, sports, family, all, etc.). In response to receiving a user selection, the media guidance application may selectively extract on-demand listings from the guidance display that match the user selected category of interest. In a more particular example, the media guidance application may access a media guidance data source or media content source and search through content metadata to determine which listings are on-demand listings and which of those listings match the user selected category of interest. The media guidance application may then provide the user with a guidance display, where a divided portion of the guidance display provides on-demand listings relating to a particular category of interest.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

For example, as described above, the media guidance application may select one or more categories of interest for extracting on-demand listings from media guidance application listings based on a user profile, user history, previously recorded content, previously ordered content, parental control settings, etc.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

An organization option 220 may be included to allow the user to organize media guidance application listings or any other suitable content. In particular, selection of organization option 220 may navigate the user to one of the guidance displays shown in FIGS. 5-8, 10, and 11. In some embodiments, the selection of organization option 220 may navigate the user to category of interest prompt 910 (FIG. 9), which allows the user to instruct the media guidance application to extract on-demand listings from the media guidance application listings based on defined media parameters (e.g., a particular genre, a particular time slot, a particular rating, etc.).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
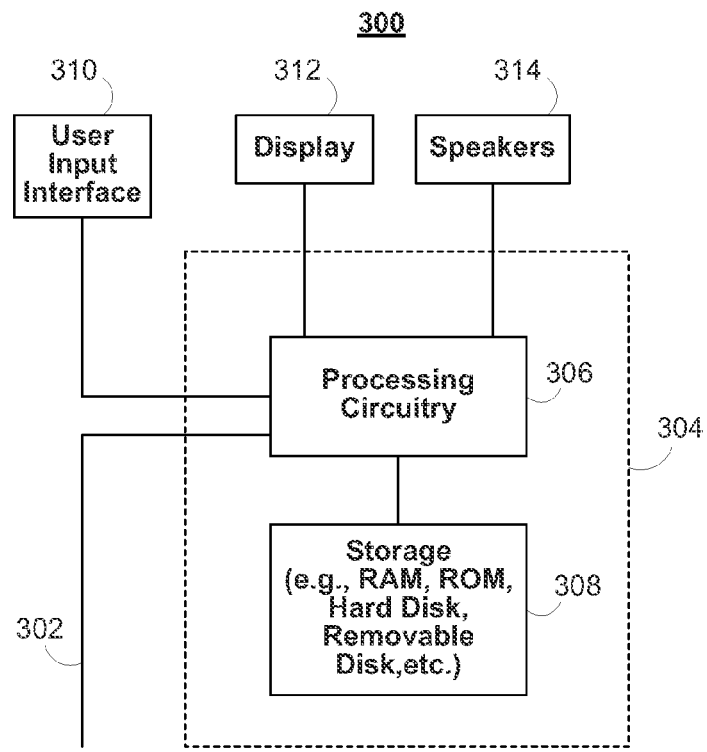
FIG. 3 shows an illustrative user equipment device in accordance with some embodiments of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

In some embodiments, control circuitry 304 may be configured to receive instructions from user input interface 310. For example, control circuitry 304 may cause media guidance application listings to be presented by selecting a selectable option in a display screen (e.g., a listings option) or pressing a dedicated button (e.g., a GUIDE button) on a remote control or other user input interface 310.

In some embodiments, control circuitry 304 may be configured to receive an instruction from user input interface 310 to organize the media guidance application listings. In response to receiving the instruction, control circuitry 304 may determine which media guidance application listings are on-demand listings (e.g., from within the guidance display, from all available listings, etc.). Control circuitry 304 may render an animation or any other suitable sequence of images that removes the extracted on-demand listings from the guidance display and moves the extracted on-demand listings to a different portion of the guidance display. Control circuitry 304 may allow the user to navigate within different portions of the guidance display, where one portion has non-on-demand listings and another portion has on-demand listings. Control circuitry 304 may also allow the user to switch navigational control between the different portions of listings.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
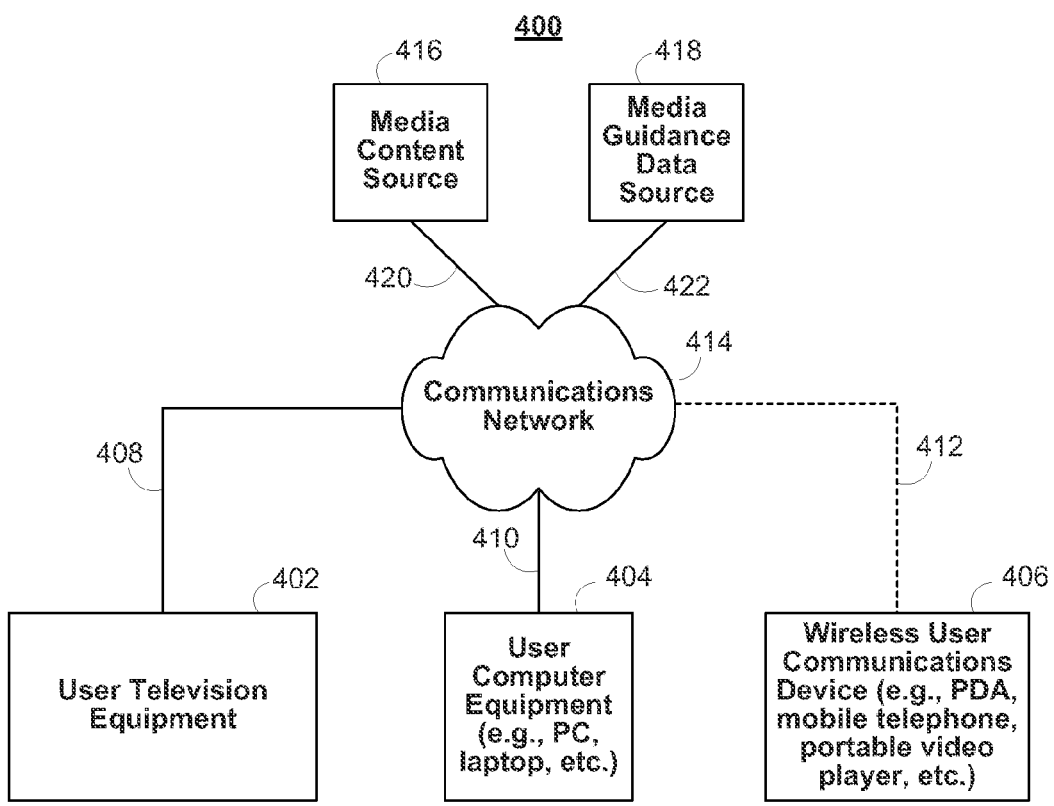
FIG. 4 is a diagram of an illustrative cross-platform interactive media system in accordance with some embodiments of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above.

Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications or the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry 304 may display media guidance application listings to the user. For example, control circuitry 304 may display media guidance application listings by providing a display similar to grid 102 of FIG. 1 or a mosaic display with program listings similar to display 200 of FIG. 2. In some embodiments, the media guidance application listings may be displayed simultaneously with a program or video of the program being watched. In particular, control circuitry 304 may allow the user to browse program listings for other programs while watching the program on the display.

FIG. 5 shows an illustrative guidance display 500 containing on-demand listings and non-on-demand listings in accordance with some embodiments of the invention. Similar to FIG. 1, a user may indicate a desire to access mixed media guidance information by selecting a selectable option provided in a display screen (e.g., a television listings option 204) or pressing a dedicated button (e.g., a GUIDE button) on a remote control or other user input interface or device. In response to receiving an indication from the user, control circuitry 304 may provide a guidance display with non-on-demand listings 230, such as broadcast listings and other content that may be provided according to a schedule, and on-demand listings 235. For example, as shown, guidance display 200 may include broadcast listings 230, such as "Live News 01" and "Live Entertainment Updates" on Ch. 1 (FOX). As also shown in FIG. 2, guidance display 200 may include on-demand listings 235, such as "Show 02" and "Recorded NBA Game" on Ch. 3 (ABC) and Ch. 2 (ESPN), respectively.

It should be noted that media guidance application listings for on-demand content, such as on-demand listings 235, may be placed into guidance display 200 using any suitable approach.

For example, as shown in guidance display 200, control circuitry 304 may retrieve an on-demand listing and dynamically place the on-demand listing in a cell adjacent to related content (e.g., "Recorded NBA Game" is placed in the cell following the program "Live NBA Game"). In particular, control circuitry 304 may receive an on-demand asset for populating into a grid from a content provider, determine keywords associated with the received on-demand asset, and search through metadata or any suitable media guidance data for content with metadata matching the keywords.

An illustrative example is shown in connection with media guidance listings 540 and 545. Upon receiving the on-demand media asset having the program title "New Moon," control circuitry 304 may determine keywords associated with the on-demand media asset. For example, control circuitry 304 may retrieve keywords in metadata associated with the on-demand asset or keywords provided by the content provider. In another example, control circuitry 304 may access media content source 416 or media guidance data source 418 to determine one or more keywords, such as "vampire" and "werewolf," for association with the on-demand asset. In response, control circuitry 304 may search through program metadata (e.g., associated with broadcast programming) for content matching the keywords "vampire" and "werewolf." Upon finding content, such as broadcast listing 540, with metadata that matches one or more keywords, control circuitry 304 may dynamically place a listing for the on-demand asset adjacent to broadcast listing 540. As shown in FIG. 5, on-demand listing 545 for the on-demand content "New Moon" has been dynamically inserted in the cell immediately adjacent to broadcast listing 540, which is a broadcast listing for the movie "American Werewolf in London."

It should be noted that, in some embodiments, control circuitry 304 may dynamically place a listing of the on-demand asset adjacent to any suitable number of listings. Additionally or alternatively, the on-demand asset may instruct control circuitry 304 to dynamically place a listing of the on-demand asset adjacent to a predetermined number of broadcast listings (e.g., one listing, five listings, etc.).

It should also be noted that, in some embodiments, control circuitry 304 may update the placement of on-demand listings. For example, to not obscure upcoming listings for programming scheduled on a particular channel, control circuitry 304 may update the placement of on-demand listings as time elapses. In particular, when the current time approaches 8:00 PM, control circuitry 304 may remove the placement of on-demand listing 535 for "Recorded NBA Game" and replace it with the broadcast listing assigned by the particular channel. In another example, control circuitry 304 may update the placement of on-demand listings as the user browses through guidance display 500.

In some embodiments, control circuitry 304 may monitor user interaction with dynamically placed on-demand assets. For example, control circuitry 304 may monitor whether the user has highlighted the on-demand listing (e.g., listing 545) in the grid, whether the user has selected the on-demand listing in the grid, whether the user has watched a preview of the on-demand asset, whether the user has purchased the on-demand asset, etc. In some embodiments, control circuitry 304 may transmit user interaction information to the content provider associated with the dynamically placed on-demand asset. Alternatively, control circuitry 304 may store user interaction information for determining categories of interest, preferred content, etc.

Additionally or alternatively, control circuitry 304 may retrieve an on-demand listing relating to a particular channel and dynamically place the on-demand listing in a cell assigned to the particular channel. For example, control circuitry 304 may determine that channel 5 is the HBO On Demand channel and, in response to the determination, dynamically place HBO On Demand content in the row assigned to the HBO On Demand channel.

In some embodiments, control circuitry 304 may dynamically generate personalized channels. Personalized channels may be generated based on user history data (e.g., previously recorded programs, favorite channels, program reminders, previous keyword searches, etc.). In some embodiments, personalized channels may be generated based on receiving a user selection of a genre, a category of interest, or a keyword.

For example, as shown in rows 550 of FIG. 5, control circuitry 304 may determine from user history data, user profile information, or any other suitable user data to generate a personalized channel related to the keyword "horse." In response to the determination, control circuitry 304 may search through program metadata or any other suitable media guidance data to determine content matching the keyword "horse." As shown in the row corresponding to channel 901, which is indicated by the channel identifier "HORSE1," control circuitry 304 has retrieved and populated the row with the media guidance application listings for "A Man Named Horse" on the A&E channel that starts at 7:00 PM (listing 555), "The Horse Whisperer" on the TNT channel that starts at 8:00 PM, and "Mr. Ed" on the NICK channel that starts at 9:00 PM.

In some embodiments, control circuitry 304 may retrieve media guidance application listings for content scheduled at the same time. For example, control circuitry 304 has performed a search through storage for content matching the keyword "horse" and retrieved two broadcast listing, such as listing 555 for "A Man Named Horse" on the A&E channel and listing 560 for "Only Fools and Horses" on the BBC channel. In response, control circuitry 304 may generate an additional personalized channel, such as channel 902, which is indicated by the channel identifier "HORSE2." As shown in FIG. 5, listing 560 for the program "Only Fools and Horses" has been placed into a newly generated channel row.

In some embodiments, control circuitry 304 may retrieve media guidance application listings for populating into a row for a personalized channel. For example, control circuitry 304 may search for broadcast listings for populating into the additional personalized channel identified by "HORSE2." In response to determining that no other broadcast content fits into an empty cell in the channel row, control circuitry 304 may search for other content that matches the particular keyword. For example, in response to determining that there are no broadcast programs showing at 8:00 PM having metadata matching the keyword "horse," control circuitry 304 may determine which on-demand assets have metadata matching the keyword "horse" and select one of the on-demand assets for populating the empty cell. As shown in FIG. 5, control circuitry 304 has retrieved and populated the cell with on-demand listing 565 for "Seabiscuit."

In some embodiments, control circuitry 304 may allow the user to organize the plurality of media guidance application listings provided in guidance display 500. For example, while browsing through media guidance application listings, control circuitry 304 may provide the user with access to a divided guidance display that organizes media guidance application listings between on-demand assets and non-on-demand assets. For example, as shown in FIGS. 2 and 5-11, control circuitry 304 may provide the user with organization option 220. Organization option 220 may allow the user to organize content information based on media type, genre or category information, media format, and/or other organization criteria or type of guidance data. For example, the user may select organization option 220 to organize on-demand content from non-on-demand content.

In some embodiments, control circuitry 304 may monitor the media guidance application listings provided in guidance display 500. In response to determining that there are multiple content types (e.g., on-demand assets and non-on-demand assets), control circuitry 304 may activate organization option 220 (e.g., allow the user to select or press organization option 220). Additionally or alternatively, the user may select organization option 220 and, in response, control circuitry 304 may determine whether there are multiple content types within guidance display 500.

As shown in FIG. 5, the user may navigate cursor 225 to organization option 220 and press a select key on the user input device. Alternatively, organization option 220 may be selected by the user by pressing a dedicated button on the user input device.

In response to receiving an indication from the user to organize on-demand content from non-on-demand content (e.g., using organization option 220), control circuitry 304 may determine which listings within the media guidance listings shown in display 200 are on-demand listings. In some embodiments, control circuitry 304 may access a database of media guidance application listings and search through metadata relating to content type or content source to determine which media guidance application listings are on-demand listings. Alternatively or additionally to determining which listings within guidance display 200 are on-demand listings, control circuitry 304 may determine which media guidance application listings currently stored in the user equipment (e.g., storage 308 of FIG. 3) are on-demand listings. As such, control circuitry 304 may provide the user with available on-demand listings and, as the user browses through media guidance application listings, may instantaneously update the guidance display to indicate which on-demand listings have been extracted from the media guidance application listings.

In response to determining which media guidance application listings are on-demand listings, control circuitry 304 may divide the guidance display into at least an on-demand portion containing on-demand listings and a non-on-demand portion containing non-on-demand listings. The non-on-demand portion may appear similar to the grid program listings display shown in FIG. 1 or FIG. 5. In addition, the non-on-demand portion may indicate which on-demand listings have been extracted from within the non-on-demand portion.

Figure 6:
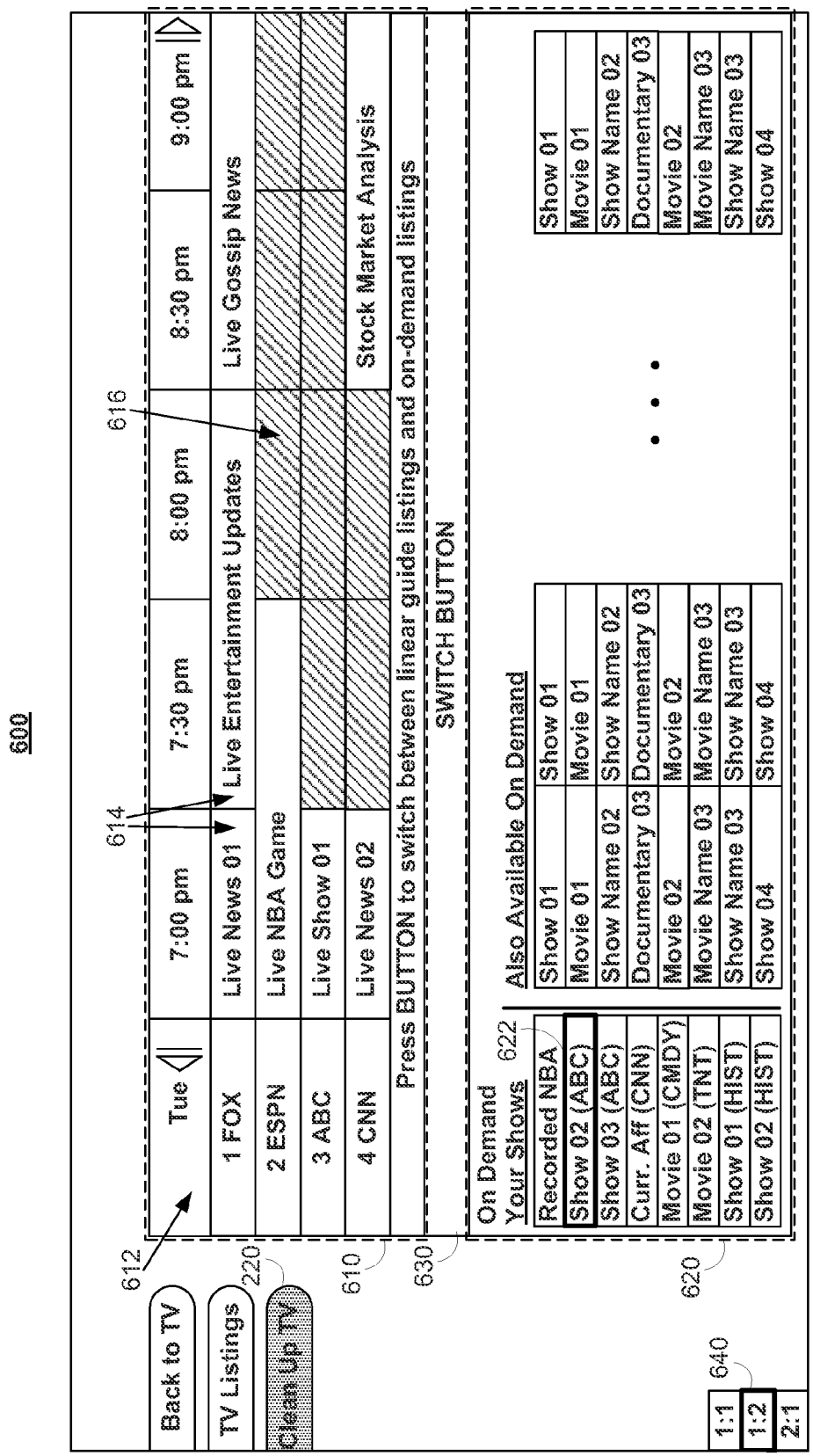
FIG. 6 shows an illustrative display screen that horizontally divides non-on-demand media guidance application listings and on-demand media guidance application listings into different portions in accordance with some embodiments of the invention.
Figure 7:
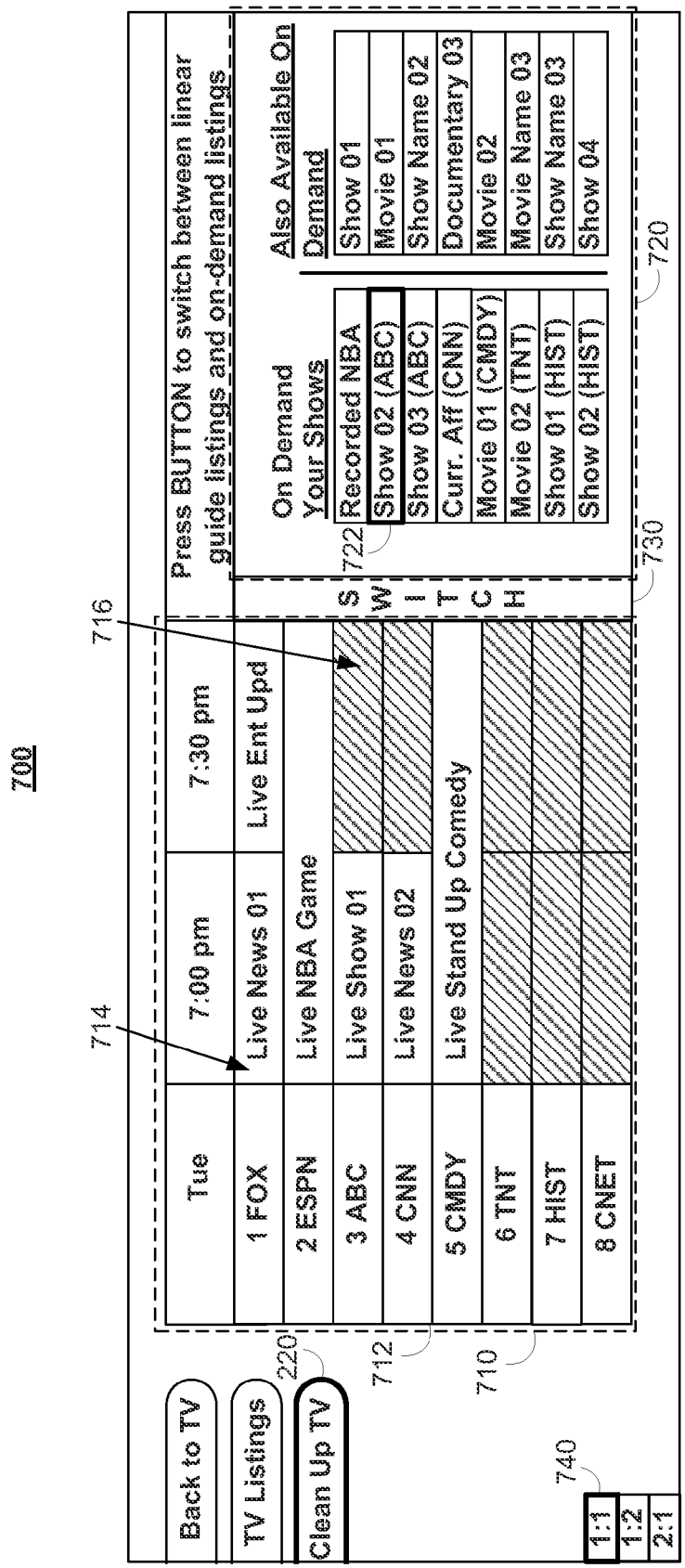
FIG. 7 shows an illustrative display screen that vertically divides non-on-demand media guidance application listings and on-demand media guidance application listings into different portions in accordance with some embodiments of the invention.
Figure 8:
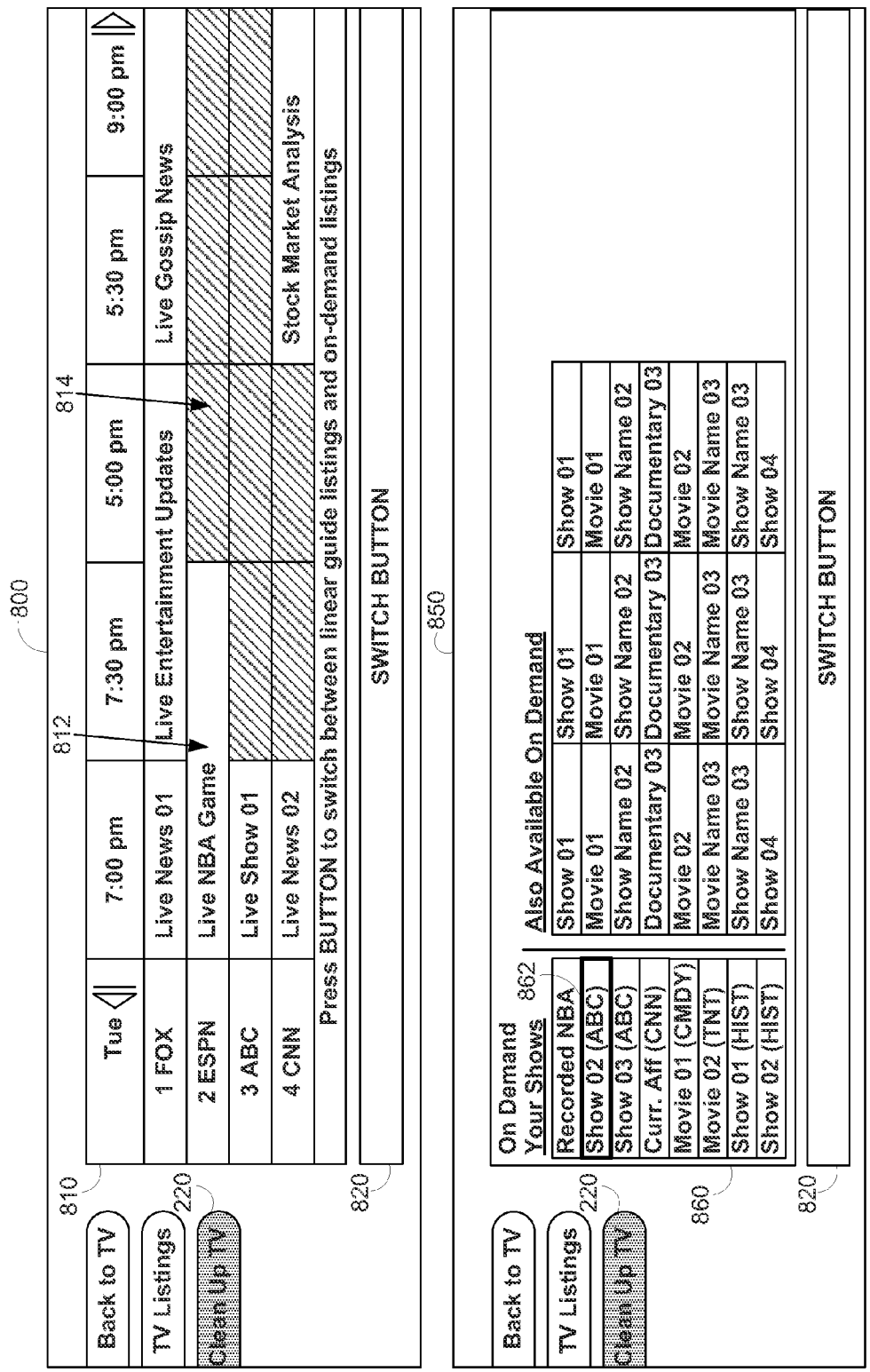
FIG. 8 shows an illustrative display screen that divides non-on-demand media guidance application listings into a first window and on-demand media guidance application listings into a second window in accordance with some embodiments of the invention.

It should be noted that control circuitry 304 may present the user with on-demand portion and non-on-demand portion of guidance display using any suitable arrangement. For example, as shown in FIGS. 6 and 7, control circuitry 304 extracts on-demand listings from guidance display and presents a non-on-demand portion that indicates the extracted on-demand listings and an on-demand portion with the extracted on-demand listings. In another example, as shown in FIG. 8, control circuitry 304 may provide on-demand listings and non-on-demand listings in pop-up windows. In yet another example, in response to receiving an indication that the user has selected the organization option 220, control circuitry 304 may extract on-demand listings from a guidance display provided on a first user equipment device, indicate on the guidance display of the first user equipment device the locations of the extracted on-demand listings, and instruct a second screen device to provide a list of the extracted on-demand listings for playback and retrieval.

FIG. 6 shows an illustrative divided guidance display 600 in accordance with some embodiments of the invention. As shown, guidance display 600 includes a non-on-demand listings portion 610, an on-demand listings portion 620, and a navigation control option 630. As discussed above, non-on-demand listings portion 610 may contain non-on-demand listings, such as broadcast listings 614 for "Live News 01" and "Live Entertainment News," in a grid 612.

It should be noted that grid 612 presented in non-on-demand listings portion 610 may be any suitable portion of the grid shown in display 500 of FIG. 5. For example, grid 612 may include half of the number of rows of the grid shown in display 500 of FIG. 5. In another example, grid 612 and the associated media guidance application listings may occupy half of the available screen size.

In response to receiving an indication that the user has selected organization option 220, control circuitry 304 may determine which media guidance application listings from at least within non-on-demand listings portion 620 are on-demand listings. Upon determining which media guidance application listings from within non-on-demand listings portion 620 are on-demand listings, control circuitry 304 may extract the on-demand listings from the media guidance application listings. Grid 612 presented in non-on-demand listings portion 610 may also provide an indication for each of the extracted on-demand listings from within non-on-demand listings portion 610. The indication may be, for example, a shaded area, such as a shaded cell 616. In some embodiments, the indication may be provided in the form of an animation or a sequence of images, where an extracted on-demand listing fades into the background until a shaded cell remains. In another example, the animation may present holes that are punched into locations of extracted on-demand listings.

In some embodiments, control circuitry 304 may display on-demand listings in on-demand listings portion 620. On-demand listings portion 620 may include the on-demand listings that were extracted from non-on-demand listings portion 610 or the listings in display 500 of FIG. 5.

In some embodiments, control circuitry 304 may display additional on-demand listings that are available for playback by the user in on-demand listings portion 620. For example, control circuitry 304 may determine additional on-demand listings stored in the user equipment (e.g., in storage 308 of FIG. 3) that are available for playback. In another example, control circuitry 304 may determine content providers subscribed to by the user (e.g., HBO and HBO On Demand offerings), programs that were recorded by the user, and/or content that was locally stored by the user and retrieve the associated media guidance application listings or media guidance data for display in on-demand listings portion 320.

In some embodiments, for on-demand listings portion 320, control circuitry 304 may also supplement the on-demand listings with media guidance data or access to media guidance applications (e.g., web-based applications or cloud-based applications) from over-the-top (OTT) content providers.

It should be noted that, although on-demand listings portions 620 in FIG. 6 presents a listing of on-demand assets, any suitable arrangement may be provided. For example, a video region containing a video clip preview may be provided adjacent to each on-demand listing. In another example, a transfer playback option may be provided adjacent to each on-demand listing, where the transfer playback option allows the user to playback the corresponding on-demand asset on a first user equipment device or a second screen device (e.g., a wireless communications device). In yet another example, in response to receiving an indication that the user has selected the organization option 220, control circuitry 304 may extract on-demand listings from a guidance display provided on a first user equipment device, indicate on the guidance display of the first user equipment device the locations of the extracted on-demand listings, and instruct a second screen device to present on-demand listings portion 320, which contains the extracted on-demand listings and/or additional on-demand listings for playback and retrieval.

In some embodiments, control circuitry 304 may allow the user to navigate within different portions of the divided listings in guidance display 600. For example, as shown in FIG. 6, the user is provided with cursor 622 for navigating through and/or selecting from on-demand listings within on-demand listings portion 620. Control circuitry 304 may allow the user to return to navigating within the non-on-demand listings portion 610 by using, for example, a navigation control option 630. In response to receiving an indication that the user has selected navigation control option 630 (e.g., by navigating cursor 622 to navigation control option 630 and pressing a select key on the user input device, by pressing a dedicated button on the user input device, etc.), control circuitry 304 may direct cursor 622 to non-on-demand listings portion 610.

It should be noted that, in some embodiments, navigation control option 630 may allow the user to move cursor 622 between non-on-demand listings portion 610 and on-demand listings portion 620. In some embodiments, navigation control option 630 may allow the user to toggle between any number of divided listings portions generated by control circuitry 304.

In some embodiments, control circuitry 304 may allow the user to control the size of on-demand listings portion 620 with respect to non-on-demand listings portion 610. For example, guidance display 600 may include a screen ratio option 640. Screen ratio option 640 may allow the user to change between different ratios of the divided portions. In particular, the user has selected a ratio of 1:2 with screen ratio option 640, which divides the media guidance application listings such that non-on-demand listings portion 610 occupies one-third of display 600 and on-demand listings portion 620 occupies two-thirds of display 600. Any other suitable option for dividing screen size may also be used, such as, for example, a percentage, a number of rows, etc.

An alternative display arrangement for providing media guidance application listings that are divided into different portions is shown in FIG. 7. As shown, control circuitry 304 may provide a guidance display 700 that vertically divides the media guidance application listings into a non-on-demand listings portion 710 and an on-demand listings portion 720.

As described above, non-on-demand listings portion 710 may contain non-on-demand listings, such as a broadcast listing 714 for "Live News 01," in a grid 712. Grid 712 provided in non-on-demand listings portion 710 may be any suitable portion of the grid shown in guidance display 500 of FIG. 5. For example, grid 712 may include half of the number of columns or timeslots of the grid shown in display 500 of FIG. 5.

In addition to providing non-on-demand listings, control circuitry 304 may also extract on-demand listings from non-on-demand listings portion 710 and provide an indication for each of the extracted on-demand listings within non-on-demand listings portion 710. The indication may be, for example, a shaded region 716. In some embodiments, the indication may be provided in the form of an animation, where extracted on-demand listings fade into the background until shaded cells remain. The animation may also cause the extracted on-demand listings to shift horizontally into on-demand listings portion 720.

On-demand listings portion 420 may include the on-demand listings that were extracted from non-on-demand listings portion 710 or the listings in guidance display 500 of FIG. 5. In some embodiments, on-demand listings portion 720 may also include additional on-demand listings that are available for playback by the user. As described above in connection with FIG. 6, control circuitry 304 may retrieve and display additional on-demand listings that are available for playback by the user in on-demand listings portion 720. For example, control circuitry 304 may determine additional on-demand listings stored in the user equipment (e.g., in storage 308 of FIG. 3) that are available for playback. In another example, control circuitry 304 may determine content providers subscribed to by the user (e.g., HBO and HBO On Demand offerings), programs that were recorded by the user, and/or content that was locally stored by the user and retrieve the associated media guidance application listings or media guidance data for display in on-demand listings portion 320.

In some embodiments, control circuitry 304 may allow the user to set guidance settings indicating whether to divide the media guidance application listings in the listings display horizontally or vertically. Alternatively or additionally, control circuitry 304 may provide the user with a division option for indicating whether to divide the guidance display horizontally or vertically.

Another alternative display arrangement for providing media guidance application listings divided into different portions is shown in FIG. 8. As shown, control circuitry 304 may divide the media guidance application listings in a guidance display into a non-on-demand listings portion 810 displayed in a first pop-up window 800 and an on-demand listings portion 860 in a second pop-up window 850. In some embodiments, first pop-up window 800 and second pop-up window 850 may overlap.

Non-on-demand listings portion 810 may contain non-on-demand listings, such as a broadcast listing 812 for "Live NBA Game" in a grid similar to the one shown in FIG. 5. As shown in first pop-up window 800, the grid presented in non-on-demand listings portion 810 may be any suitable portion of the grid shown in guidance display 500 of FIG. 5. For example, the grid may include a predetermined number of rows of the grid shown in guidance display 500 of FIG. 5. In another example, the grid may include a particular number of rows based on the available screen area.

In addition to providing non-on-demand listings, control circuitry 304 may also extract on-demand listings from non-on-demand listings portion 810 and provide an indication for each of the extracted on-demand listings within non-on-demand listings portion 810. The indication may be, for example, a shaded region 814 that replaces the listing for "Recorded NBA Game." In some embodiments, the indication may be provided in the form of an animation, where an extracted on-demand listing pops out from non-on-demand listings portion 810 and jumps into on-demand listings portion 860 in pop-up window 850.

On-demand listings portion 860 may include the on-demand listings that were extracted from non-on-demand listings portion 810 or the listings in guidance display 500 of FIG. 5. In some embodiments, control circuitry 304 may retrieve and display additional on-demand listings that are available for playback by the user in on-demand listings portion 820 of pop-up window 850. For example, control circuitry 304 may determine additional on-demand listings stored in the user equipment (e.g., in storage 308 of FIG. 3) that are available for playback. In another example, control circuitry 304 may determine content providers subscribed to by the user (e.g., HBO and HBO On Demand offerings), programs that were recorded by the user, and/or content that was locally stored by the user and retrieve the associated media guidance application listings or media guidance data for display in on-demand listings portion 820 of pop-up window 850.

In some embodiments, control circuitry 304 may allow the user to switch between navigating within the listings of non-on-demand listings portion 810 in pop-up window 800 and navigating within the listings of on-demand listings portion 860 in pop-up window 850. For example, as shown in FIG. 8, the user is provided with navigation control option 820. In response to receiving an indication that the user has selected navigation control option 820 while the user is browsing through listings within on-demand listings portion 860, the interactive media guidance application may direct cursor 862 to a media guidance application listing within non-on-demand listings portion 810 in pop-up window 800. In some embodiments, navigation control option 820 may allow the user to toggle between a plurality of divided listings portions in different pop-up windows generated by control circuitry 304.

Figure 9:
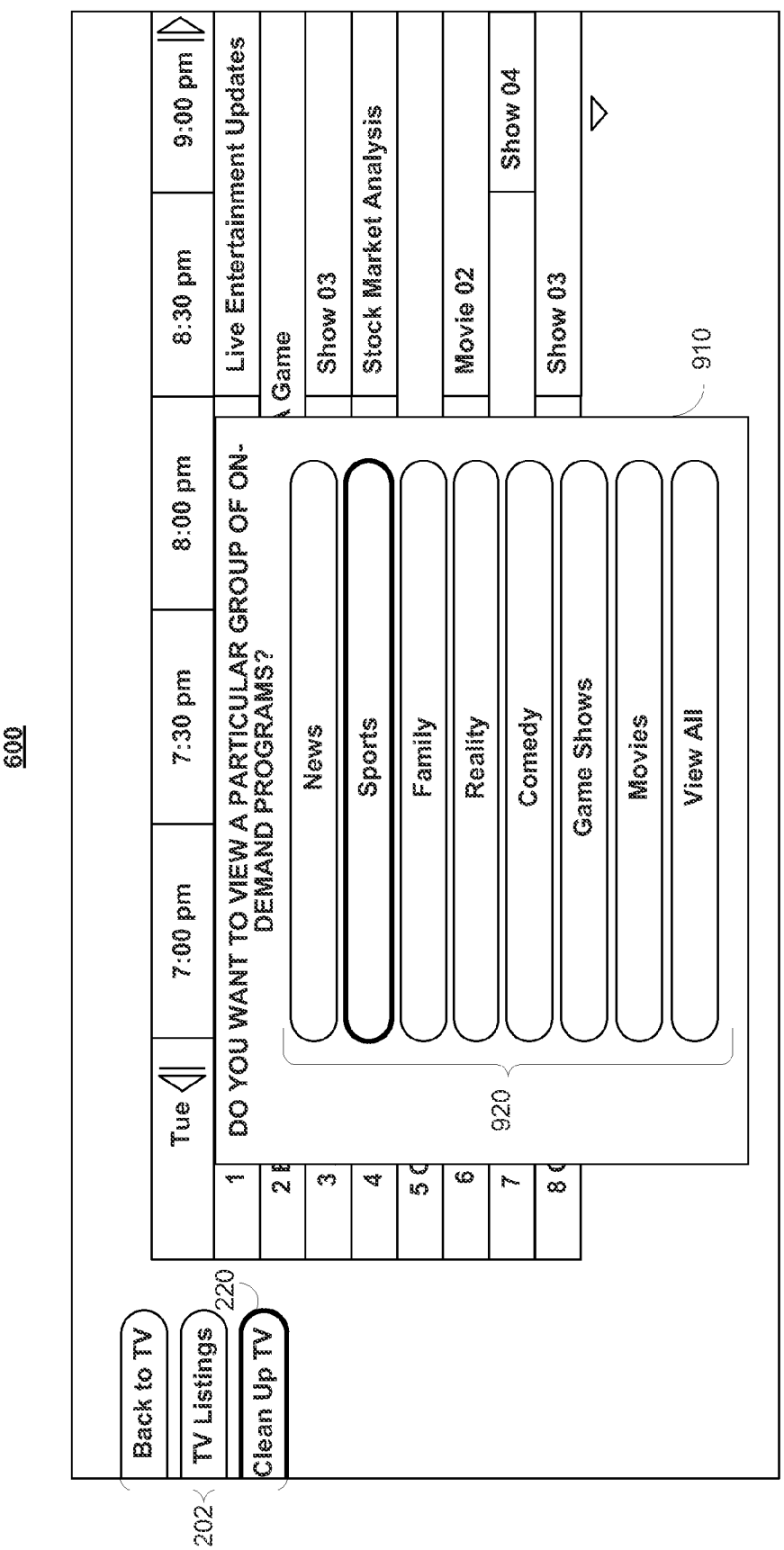
FIG. 9 shows an illustrative display of a genre or a category of interest prompt for extracting guidance application listings in accordance with some embodiments of the invention.
Figure 10:
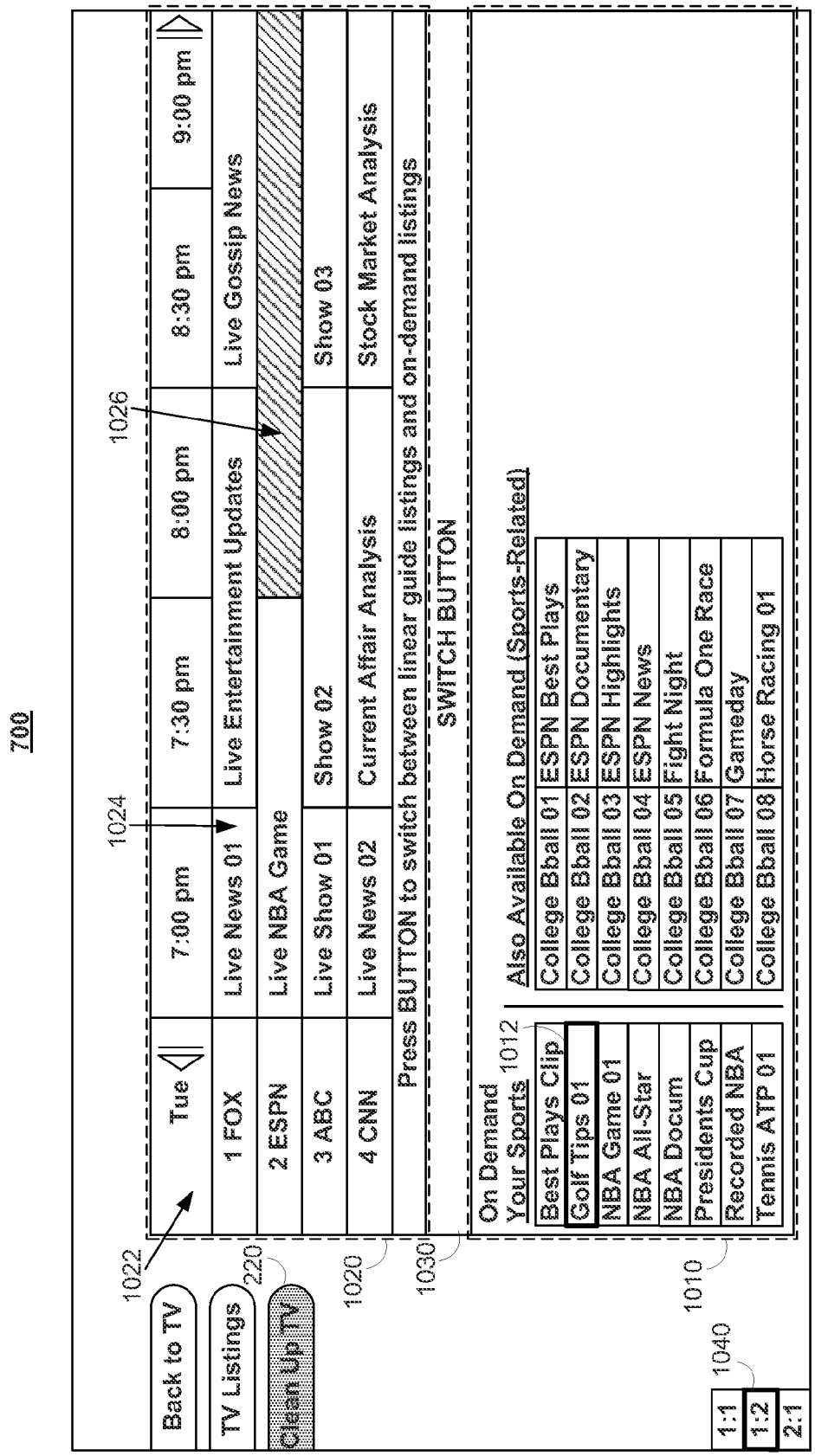
FIG. 10 shows an illustrative display screen that divides non-on-demand media guidance application listings and on-demand media guidance application listings into different portions based on a selected genre or category in accordance with some embodiments of the invention.

In some embodiments, control circuitry 304 may provide the user with options for dividing media content. For example, in response to the user selecting organization option 220, the interactive media guidance application may generate a prompt for display. An illustrative example of a prompt 900 is shown in FIG. 9. Prompt 900 may provide the user with an opportunity to input a category of interest, such as a particular genre (e.g., sports, family, action, game shows, etc.). In some embodiments, prompt 900 may allow the user to instruct control circuitry 304 to extract all on-demand listings regardless of genre or category (e.g., by selecting a "view all" option).

Based on the received category of interest, control circuitry 304 may extract on-demand listings from the media guidance application listings 500 in FIG. 5 that fall within the received category of interest. In particular, in response to receiving a category of interest, control circuitry 304 may query a storage device, a media content server, or any other suitable source to determine which media guidance application listings are on-demand listings and which of the on-demand listings fall within the category of interest. In a more particular example, control circuitry 304 may search through metadata or any other suitable media guidance data to determine which media guidance application listings have metadata that indicate the content is on-demand content and that have keywords matching or falling within the category of interest.

Additionally, control circuitry 304 may cause the guidance display to be divided into portions, where the second portion of on-demand media assets includes the extracted on-demand listings that meet the category of interest.

For example, upon displaying prompt 900 of FIG. 9, the user may select the "sports" category of interest for extracting on-demand assets. In response to selecting the "sports" genre or category, control circuitry 304 may provide guidance display 1000. To generate guidance display 1000, control circuitry 304 may determine which media guidance application listings within grid 1022 (or the grid shown in FIG. 5) are on-demand listings that fall within the "sports" genre or category. In response to the determination, control circuitry 304 may extract those on-demand listings, such as on-demand listing 1026 originally displayed within grid 1022, and provide an indication (e.g., a shaded region) showing that on-demand listings 1026 has been removed from grid 1022.

Upon extracting the on-demand listings from grid 1022, control circuitry 304 may provide a divided guidance display, where an on-demand listings portion 1010 and a non-on-demand listings portion 1020 are provided. Non-on-demand listings portion 1020 contains non-on-demand listings and indications of the extracted on-demand listings that are sports-related within non-on-demand listings portion 1020. On-demand listings portion 1010 contains on-demand listings that are related to sports and includes at least the on-demand listings extracted from non-on-demand listings portion 1020. Control circuitry 304 may also supplement on-demand listings portion 1020 with additional sports-related on-demand media listing.

Referring back to FIG. 2, control circuitry 304 presents the user with a video mosaic display 200 for providing media guidance. Mosaic display 200 includes media guidance application listings 206, 208, 210, and 212. In some embodiments, the listings may include a media portion 214, such as cover art, still images from the content, video clip previews, live video from the content, or other types of content that indicate to the user the content being described by the media guidance data in the listing, and a textual portion 216.

Figure 11:
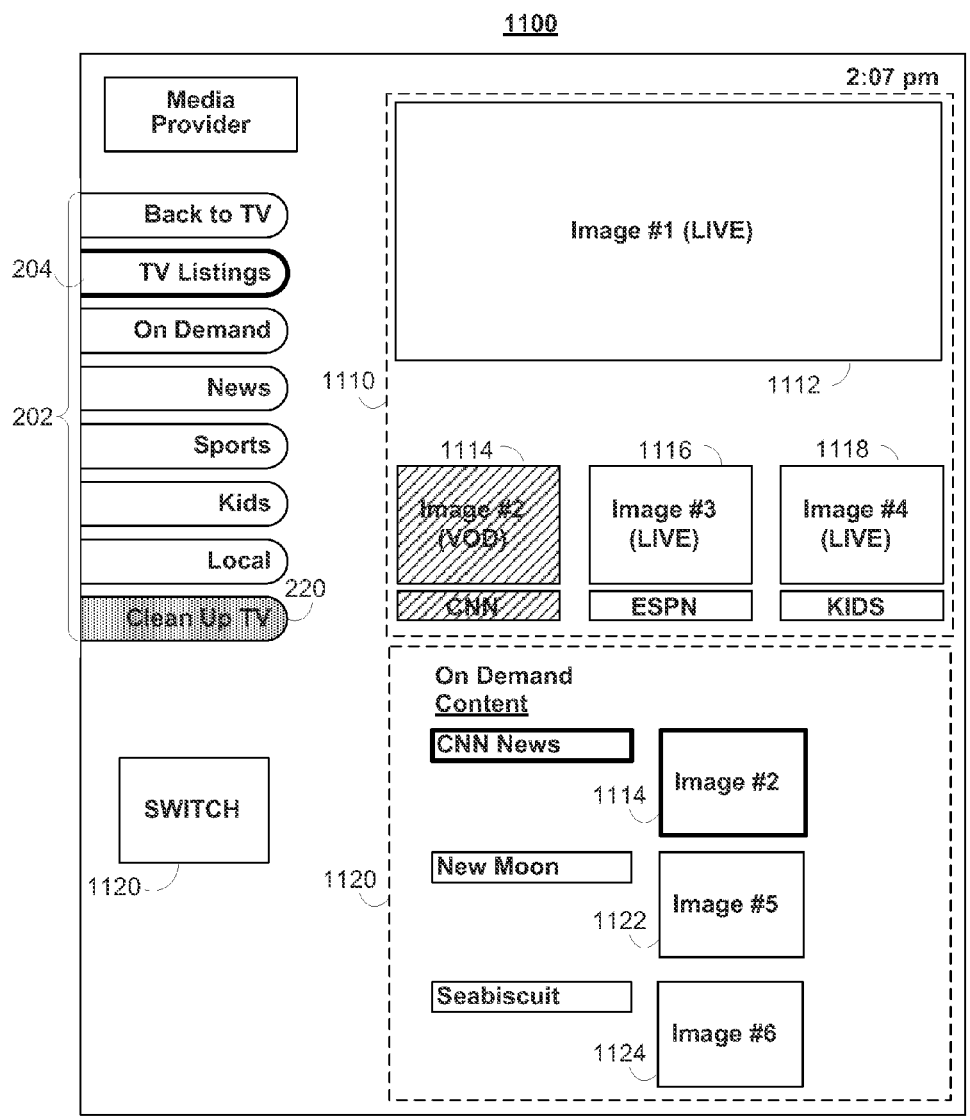
FIG. 11 shows an illustrative mosaic display screen that divides non-on-demand media guidance application listings and on-demand media guidance application listings into different portions in accordance with some embodiments of the invention.

In response to selecting organization option 220, control circuitry 304 may extract on-demand listings from video mosaic display 200 and place the extracted on-demand listings in a portion of the display separate from the non-on-demand listings. For example, as shown in FIG. 11, in response to receiving an indication that the user has selected organization option 220, control circuitry 304 determines which media guidance application listings from at least listings 1112, 1114, 1116, and 1118 are on-demand listings. In response to determining that listing 1114 is an on-demand listing within non-on-demand listings portion 1110, control circuitry 304 may indicate the extraction of listing 1114 from non-on-demand listings portion 1110 and display listing 1114 within on-demand listings portion 1120. In addition, control circuitry 304 may provide additional on-demand listings, such as listings 1122 and 1124 for "New Moon" and "Seabiscuit," respectively. In some embodiments, control circuitry 304 may restrict user navigation to a divided portion—e.g., either non-on-demand listings portion 1110 or on-demand listings portion 1120. Control circuitry 304 may allow the user to change navigational control between divided portions by using, for example, a navigational control option 1130.

Figure 12:
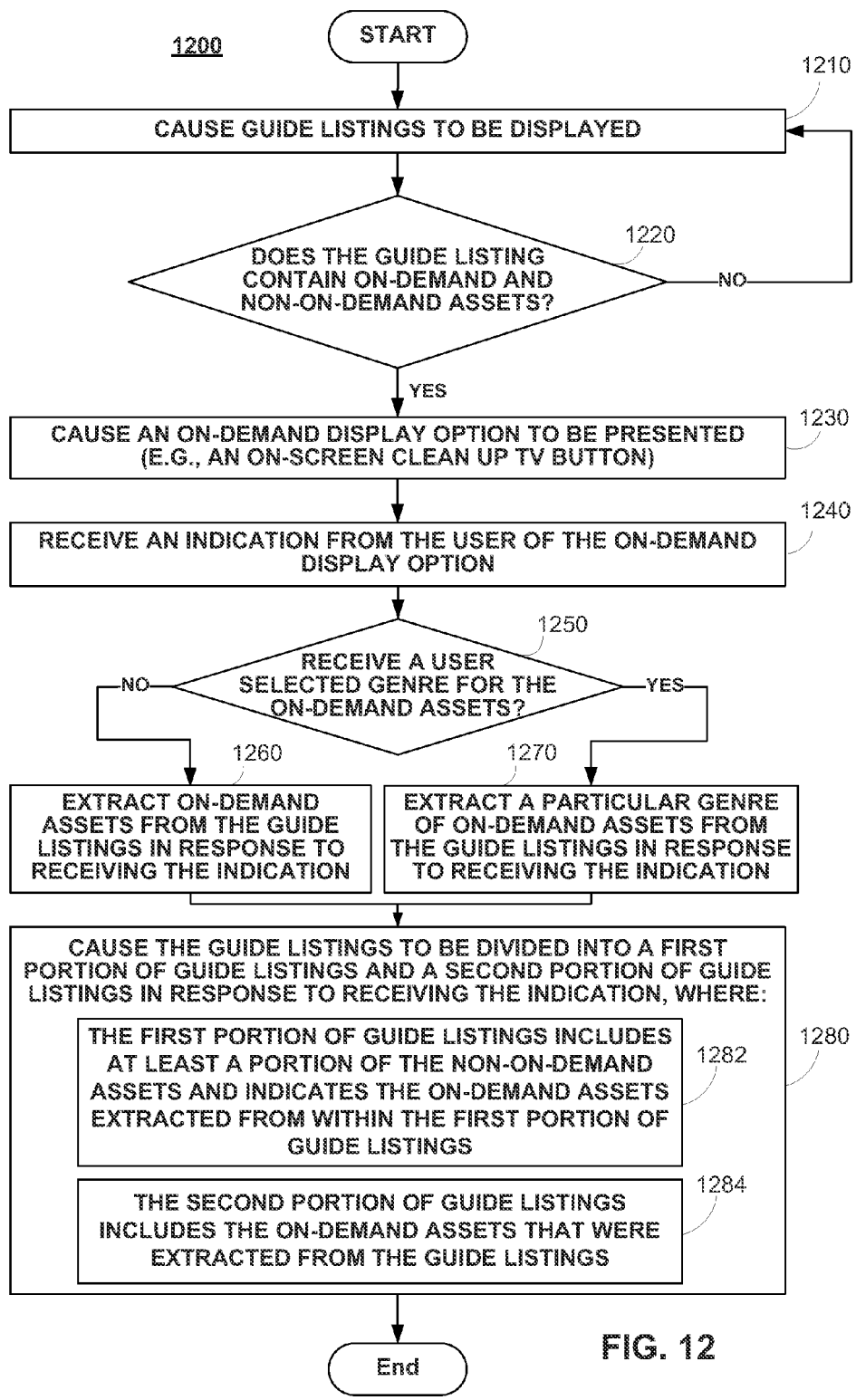
FIG. 12 illustrates a flow diagram for extracting on-demand media guidance application listings from a guidance display and dividing the media guidance application listings in a guidance display into different portions in accordance with some embodiments of the invention.

FIG. 12 illustrates a flow diagram 1200 for presenting an interactive media guidance application, where a guidance display is divided into a portion of non-on-demand guide listings and a portion of on-demand guide listings in accordance with some embodiments of the invention.

At step 1210, media guidance application listings are displayed. For example, control circuitry 304 may cause media guidance application listings to be presented by selecting a selectable option in a display screen (e.g., a listings option) or pressing a dedicated button (e.g., a GUIDE button) on a remote control or other user input interface 310.

At step 1220, control circuitry 304 may determine whether the media guidance application listings include multiple types of assets, such as on-demand assets and non-on-demand assets. For example, control circuitry 304 may search through metadata or any other suitable media guidance data to determine the content type associated with the media guidance application listings displayed at step 1210. Alternatively, control circuitry may search through metadata or any other suitable media guidance data to determine the content type associated with media guidance application listings stored in the user equipment.

In response to determining that the displayed media guidance application listings contain on-demand assets and non-on-demand assets, control circuitry 304 may provide the user with an organization option (e.g., organization option 220 in FIG. 2) at step 1230. For example, in response to determining that on-demand assets may be extracted and a guidance display that divides on-demand assets from non-on-demand assets may be provided, control circuitry 304 may activate the organization option.

In response to receiving an indication that the user has selected the organization option at step 1240, control circuitry 304 may prompt the user to indicate a genre or category of interest for organizing the media guidance application listings at step 1250. For example, as shown in FIG. 9, control circuitry 304 may allow the user to select from a plurality of categories of interest, such as news, sports, family, reality, comedy, game shows, movies, etc. In some embodiments, control circuitry 304 may determine particular genres or categories for the user based on user history information (e.g., previously viewed programs, previously recorded programs, previous keyword searches, etc.), user preference information, or user profile information.

In some embodiments, control circuitry 304 may allow the user to extract all on-demand assets from the media guidance application listings. At step 1260, control circuitry 304 may extract the on-demand assets from the media guidance application listings. For example, control circuitry 304 may search through metadata and other media guidance data to determine which of the media guidance application listings are on-demand listings. In another example, control circuitry 304 may search for on-demand listings from the currently displayed media guidance application listings.

Any suitable mechanism for extracting on-demand content to be presented in a separate portion of the guidance display may be used. For example, in some embodiments, control circuitry 304 may transmit a query to storage for content data. In response to receiving content data from storage (e.g., in an XML structure as illustrated in FIG. 13), control circuitry 304 may determine which media guidance application listings are on-demand listings for presentation in a separate portion of the guidance display. Upon determining the on-demand listings for extraction, control circuitry may save such information in storage (e.g., in an XML structure as illustrated in FIG. 13).

Referring back to step 1250, in response to determining that the user has selected a genre or a category of interest (e.g., sports), control circuitry 304 may perform the extraction of on-demand listings based on a category of interest received from the user at step 1270. For example, control circuitry 304 may search through metadata and other media guidance data to determine which of the media guidance application listings are on-demand listings and which of the media guidance application listings falls within the category of interest.

Any suitable mechanism for extracting on-demand content of a particular category may be used. For example, in some embodiments, control circuitry 304 may transmit a query to storage for content data. In response to receiving content data from storage (e.g., in an XML structure as illustrated in FIG. 13), control circuitry 304 may determine which media guidance application listings are on-demand listings and may determine which media guidance application listings have keywords or category data that falls within the category of interest. Upon determining the on-demand listings for extraction, control circuitry may save such information in storage (e.g., in an XML structure as illustrated in FIG. 13).

At step 1280, control circuitry 304 may cause the guide listings to be divided into a first portion of guide listings and a second portion of guide listings.

At step 1282, the first portion of content listings may include a portion of the media guidance application listings of the non-on-demand assets from the guidance display. The first portion of content listings may also indicate the on-demand assets extracted from within the first portion of content listings. For example, a cell corresponding to an on-demand asset may be shaded or blackened to indicate the extraction of the on-demand asset. In another example, in response to receiving the request to organize the guidance display, the control circuitry may animate the extraction of on-demand assets from the guidance display. In particular, the control circuitry may cause one or more animations to provide the appearance of dividing the guidance display into a first portion and a second portion, highlighting media guidance application listings of on-demand assets, sliding those listings to the second portion of the guidance display, and fading the extracted listings back to indicate the extraction of the on-demand assets.

At step 1284, the second portion of content listings may include media guidance application listings of the on-demand assets extracted from the first portion of media guidance application listings. In some embodiments, the second portion of guide listings may include additional listings of on-demand assets available to the user. For example, the second portion of media guidance application listings may include on-demand assets available to the user that were not listed in the guidance display. In another example, control circuitry 304 may determine content providers subscribed to by the user (e.g., HBO and HBO On Demand), programs that were recorded by the user, and/or content that was locally stored by the user in storage and retrieve the associated media guidance application listings or media guidance display for presentation in the second portion.

In some embodiments, control circuitry 304 may supplement the on-demand listings in the second portion with media guidance data or access to media guidance applications (e.g., web-based applications or cloud-based applications) from over-the-top (OTT) content providers.

Any suitable mechanism for providing additional listings of available on-demand assets may be used. For example, in some embodiments, control circuitry 304 may transmit a query to storage for content data relating to on-demand assets. In response to receiving content data from storage (e.g., in an XML structure as illustrated in FIG. 13), control circuitry 304 may determine the availability of the on-demand assets and, in some embodiments, may filter through the on-demand assets based on user history information, user preferences, user profile information, etc.

In some embodiments, the first portion of media guidance application listings may be displayed as a program listings grid and the second portion of content listings may be simultaneously displayed as a list of the extracted on-demand assets. Alternatively, control circuitry 304 may extract on-demand listings from a guidance display provided on a first user equipment device, indicate (e.g., by shading) on the guidance display of the first user equipment device the locations of the extracted on-demand listings, and instruct a second screen device to display a list of the extracted on-demand listings and/or additional on-demand listings for playback and retrieval.

In some embodiments, the guidance display may be divided horizontally, where the first portion of media guidance application listings are displayed in a grid format above the second portion of media guidance application listings of on-demand assets. Alternatively, the guidance display may be divided vertically, where the first portion of media guidance application listings and the second portion of media guidance application listings are displayed side by side.

In some embodiments, control circuitry 304 may restrict the user to navigation within one of either the first portion of media guidance application listings or the second portion of media guidance application listings. In some embodiments, control circuitry 304 may provide the user with a navigation option (e.g., a switch button) to transfer navigational control between media guidance application listings in different portions of the guidance display.

It should be noted that, although the embodiments described herein generally refer to on-demand media assets and non-on-demand media assets, this is merely illustrative. For example, the control circuitry may divide the guidance display to present media guidance application listings between linear programming (e.g., broadcast listings) and non-linear programming (e.g., on-demand listings, recorded media listings, Internet content listings, etc.).

It should be understood that the above steps of the flow diagram of FIG. 12 may be executed or performed in any order or sequence not limited to the order and sequence shown and described in the figure. Also, some of the above steps of the flow diagram of FIG. 12 may be executed or performed substantially simultaneously where appropriate or in parallel to reduce latency and processing times.

The above described embodiments of the present disclosure are presented for purposes of illustration and not of limitation, and the present disclosure is limited only by the claims which follow.

What is claimed is:

1. A method for presenting an interactive media guidance application, the method comprising:
   causing content listings to be displayed to a user, wherein the content listings include non-linear assets and non-on-demand assets;
   generating for display an on-screen option for dividing the content listings into a first portion of content listings and a second portion of content listings, wherein the user may select an on-screen option for a ratio of a size of the first portion to a size of the second portion, and wherein:
      the first portion of content listings includes at least a portion of the non-on-demand assets; and
      the second portion of content listings includes the non-linear assets that are extracted from the content listings;
   extracting the non-linear assets from the content listings in response to receiving an indication from the user; and
   causing the displayed content listings to be divided into the first portion of content listings and the second portion of content listings at the selected ratio, wherein the first portion of the content listings indicates locations of the non-linear assets extracted from the content listings.

2. The method of claim 1, wherein the content listings are displayed as a program listings grid having one or more rows of program listings.

3. The method of claim 1, wherein the first portion of content listings are displayed as a program listings grid and the second portion of content listings are displayed as a list of the extracted non-linear assets.

4. The method of claim 1, wherein the content listings occupy a screen area, further comprising dividing the screen area between the first portion of content listings and the second portion of content listings by the selected ratio.

5. The method of claim 4, wherein the first portion of content listings and the second portion of content listings are divided vertically within the screen area by the selected ratio.

6. The method of claim 4, wherein the first portion of content listings and the second portion of content listings are divided horizontally within the screen area by the selected ratio.

7. The method of claim 1, wherein the second portion of content listings further displays additional non-linear assets available to the user.

8. The method of claim 1, further comprising:
   receiving a first type of user input to select a guide listing from one of the first portion of content listings and the second portion of content listings; and
   receiving a second type of user input to navigate between the first portion of content listings and the second portion of content listings.

9. The method of claim 1, further comprising:
   receiving a category of interest from the user, wherein the content listings are organized by the category of interest;
   extracting the non-linear assets from the content listings corresponding to the received category of interest; and
   causing the second portion of content listings to be displayed, wherein the second portion of content listings includes the extracted non-linear assets from the content listings corresponding to the received category of interest.

10. The method of claim 1, further comprising causing the first portion of content listings to indicate the extracted non-linear assets from within the first portion of content listings by causing darkened portions to be displayed at locations of the extracted non-linear assets within the first portion of content listings.

11. A system for presenting an interactive media guidance application, the system comprising:
   a storage device;
   processing circuitry configured to:
   cause content listings from the storage device to be displayed to a user, wherein the content listings include non-linear assets and non-on-demand assets;
   generate for display an on-screen option for dividing the content listings into a first portion of content listings and a second portion of content listings, wherein the user may select an on-screen option for a ratio of a size of the first portion to a size of the second portion, and wherein:
      the first portion of content listings includes at least a portion of the non-on-demand assets; and
      the second portion of content listings includes the non-linear assets that are extracted from the content listings;
   extract the non-linear assets from the content listings in response to receiving an indication from the user; and
   cause the displayed content listings to be divided into the first portion of content listings and the second portion of content listings at the selected ratio, wherein the first portion of the content listings indicates locations of the non-linear assets extracted from the content listings.

12. The system of claim 11, wherein the content listings are displayed as a program listings grid having one or more rows of program listings.

13. The system of claim 11, wherein the first portion of content listings are displayed as a program listings grid and the second portion of content listings are displayed as a list of the extracted non-linear assets.

14. The system of claim 11, wherein the content listings occupy a screen area and wherein the processing circuitry is further configured to divide the screen area between the first portion of content listings and the second portion of content listings by the selected ratio.

15. The system of claim 14, wherein the first portion of content listings and the second portion of content listings are divided vertically within the screen area by the selected ratio.

16. The system of claim 14, wherein the first portion of content listings and the second portion of content listings are divided horizontally within the screen area by the selected ratio.

17. The system of claim 11, wherein the second portion of content listings further displays additional non-linear assets available to the user.

18. The system of claim 11, wherein the processing circuitry is further configured:
   receive a first type of user input to select a guide listing from one of the first portion of content listings and the second portion of content listings; and
   receive a second type of user input to navigate between the first portion of content listings and the second portion of content listings.

19. The system of claim 11, wherein the processing circuitry is further configured to:
   receive a category of interest from the user, wherein the content listings are organized by the category of interest;
   extract the non-linear assets from the content listings corresponding to the received category of interest; and
   cause the second portion of content listings to be displayed, wherein the second portion of content listings includes the extracted non-linear assets from the content listings corresponding to the received category of interest.

20. The system of claim 11, wherein the processing circuitry is further configured to cause the first portion of content listings to indicate the extracted non-linear assets from within the first portion of content listings by causing darkened portions to be displayed at locations of the extracted non-linear assets within the first portion of content listings.

\* \* \* \* \*